United States Patent [19]
Kovács

[11] Patent Number: 4,619,148
[45] Date of Patent: Oct. 28, 1986

[54] ELECTROMECHANICAL APPARATUS FOR CONVERSION OF FORCE TO ELECTRIC SIGNAL

[75] Inventor: Sándor Kovács, Budapest, Hungary

[73] Assignee: Vasipari Kutato es Fejleszto Vallalat, Hungary

[21] Appl. No.: 598,501

[22] Filed: Apr. 9, 1984

[30] Foreign Application Priority Data

Apr. 7, 1983 [HU] Hungary ............................ 1206/83

[51] Int. Cl.⁴ .............................................. G01L 1/04
[52] U.S. Cl. ................................................ 73/862.62
[58] Field of Search ........... 73/862.62, 862.63, 862.64, 73/862.65, 862.66, 862.67, 862.54, 862.56, 862.68, 862.69; 177/229, 187, 189

[56] References Cited

U.S. PATENT DOCUMENTS

4,170,270 10/1979 Sette et al. ..................... 177/229

Primary Examiner—Donald O. Woodiel
Attorney, Agent, or Firm—Handal & Morofsky

[57] ABSTRACT

The converter according to the invention allows such measuring process during which only the force to be measured participates in the conversion of force to electric signal, the point of application of which is definitely fixed and displacement of the point of application as a result of deformation brought about by the force-effect takes place without the development of additional forces and additional stress fields. Thus the converter has fitting surfaces allowing axial displacement and/or turn around a point between the part receiving the force to be measured and the measuring sensor, while the part transferring the reaction force is rigidly clamped. Suitably an elastic layer absorbing the kinetic energy is arranged between the part receiving the force to be measured and the measuring sensor.

6 Claims, 9 Drawing Figures

ELECTROMECHANICAL APPARATUS FOR CONVERSION OF FORCE TO ELECTRIC SIGNAL

FIELD AND BACKGROUND OF THE INVENTION

The invention relates to an electromechanical apparatus for conversion of force to electric signal, comprising a part receiving the force to be measured, measuring element and a part transferring the reaction force.

It is known that the mechanisms presently in technical use are based on the equilibrium of the structural force-effects. Measuring of these force effects is a frequent task in the technical life. Such tasks are associated with the further demands that in addition of the force to be measured, the dynamic forces (e.g. vibrations) arising from the environmental effects should also be eliminated during the measuring process.

The measuring tasks are frequently carried out with electric measuring method. The force measurement with electric method appeared and was generally used in the industrial measuring technique some decades ago. Conversion of the force and electric signal is accomplished primarily with the help of the so called piezo-resistivity principle. In such measuring converters the piezo-resistive measuring sensor is generally arranged on the measuring element. The measuring element suffers deformation between two mechanical poles, i.e. the active force and reaction force. Accordingly, the equilibrium of the forces is brought about through the mechanical stress field developing in the measuring element. The measuring sensing resistances on the surface of the measuring element will be altered as a result of deformation taking place under the influence of the mechanical stress, which generally upsets the equilibrium of an electric measuring bridge.

The dynamometer cells, as measuring converters can be described generally possess characteristics which depend on the formation of the measuring sensor, measuring element and measuring bridge. Such measuring converters are frequently used for instance in the industrial scale-systems, or in the measuring apparatuses of the electronic material testing machines.

For correct operation, the suitable incorporation of the measuring converters is necessary into the mechanical systems. The fundamental condition for this is that only the force to be measured should participate in the force-electric signal converter. For this reason it is essential that the measuring direction of the measuring converter and the influence line of the force to be measured should coincide, i.e. the mutual position should not be altered during the measuring process. Similarly important is that the properly fixed point of application of the force and displacement of this point of application during deformation as taking place under the influence of the force should occur without the development of additional forces and additional stress fields.

Several constructions have been developed in order to fulfill simultaneously the above described conditions for correct operation. Known is, for instance, such solution, where the force is transferred with the aid of intermediate elements. In this case the point of application of the force is on the intermediate element. Such intermediate element may be, for instance, a ball arranged in a nest, or wedge fitting into a trough or slot. A lentiform or flexible washer fitting to the end of a shaft is also applicable.

The point of application of a force may be directed also on the measuring element. In this case, it is a frequent solution that the surfaces of the measuring element carrying the point of application of the force or reaction force are spherical surfaces.

There are also known constructions where the reaction force arises on a field consisting of balls.

However none of these solutions ensure the complete fulfilment of the earlier mentioned conditions.

SUMMARY AND OBJECTS OF THE INVENTION

The object of the present invention is an improved construction, wherein the conditions of correct operation of the measuring converters can be simultaneously and completely fulfilled.

In accordance with the invention, the converter has fitting surfaces between the part receiving the force to be measured and the measuring sensor allowing axial and/or spatial turning around a point, while the part serving as the transferring layer absorbing the kinetic energy is also arranged between the part receiving the force to be measured and the measuring sensor.

The fitting surfaces allowing the axial displacement are formed as the outer surfaces of a shaft or pin and as the inner surfaces of bushing or slide.

The fitting surfaces allowing spatial turning around a point are formed suitably as ball joints.

The layer absorbing the kinetic energy is elastic material, preferably a rubber insert.

According to the invention, not only the mentioned requirements can be simultaneously and fully met, but it enables to realize the deformation of the measuring converters independently from each other at the locations of the supports (or suspensions) in the systems containing two, three or several supports (or suspensions). Thus deformation of the load bearing construction does not influence the measuring converters. This is true not only for any deformation arising from the force effects to be measured, but also for deformation occurring as a result of thermal expansion, wind-pressure, etc. independent from the previous deformation.

The construction according to the invention is applicable primarily in case of support-type measuring converters formed with a pin exposed to bending-, torsional-, shearing- or other complex stresses. However in certain cases it can be used to advantage in traditional measuring converters as well.

Further advantage of the invention is that the applied elastic layer eliminates a significant part of the effects disturbing the measuring process. The displacement takes place with inner friction in the elastic layer (such are widely used otherwise in other fields for vibration absorption) and thus absorbing the kinetic energy arising from vibration and, it is transferred to the surroundings in the form of heat.

The force converter according to the invention, as a machine unit at the location of force determination, is part of the mechanical system. The measuring element of the force converter is located between the actuating force and reaction force providing the counter-support in the force process.

BRIEF DESCRIPTION OF THE DRAWINGS

Further details of the invention are described by way of examples with the aid of drawings, in which.

DESCRIPTION OF THE PREFERRED EMBODIMENTS

Recently the holder or shaft-type measuring element has been gaining general acceptance in the force measuring converters. The measuring element may be a holder fixed on one end, or supported on both ends, or fixed on both ends. Occasionally it may be a multi-supported holder as well.

Figure 3:
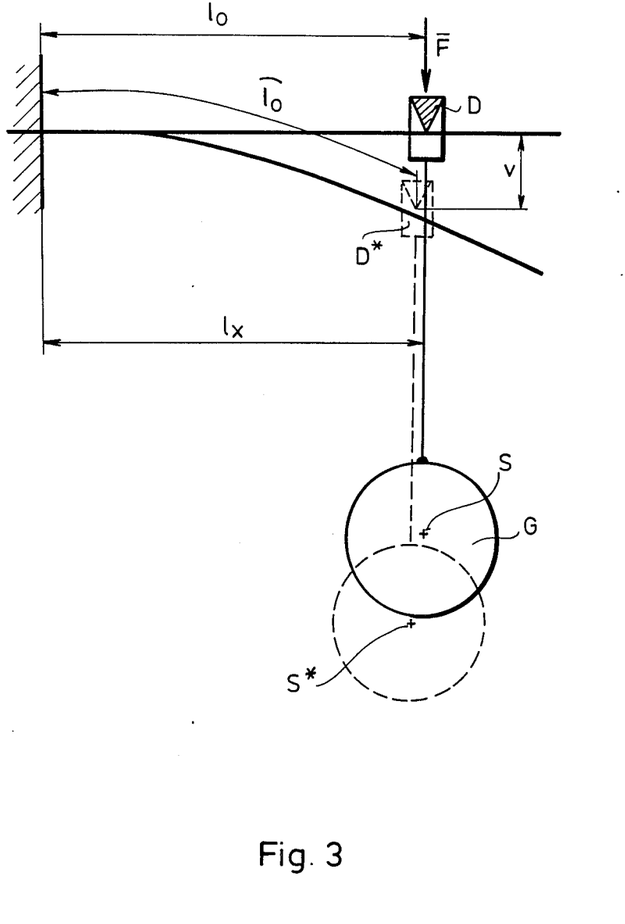
FIG. 3: Diagram showing the kinematic operation of the construction according to the invention.
Figure 4:
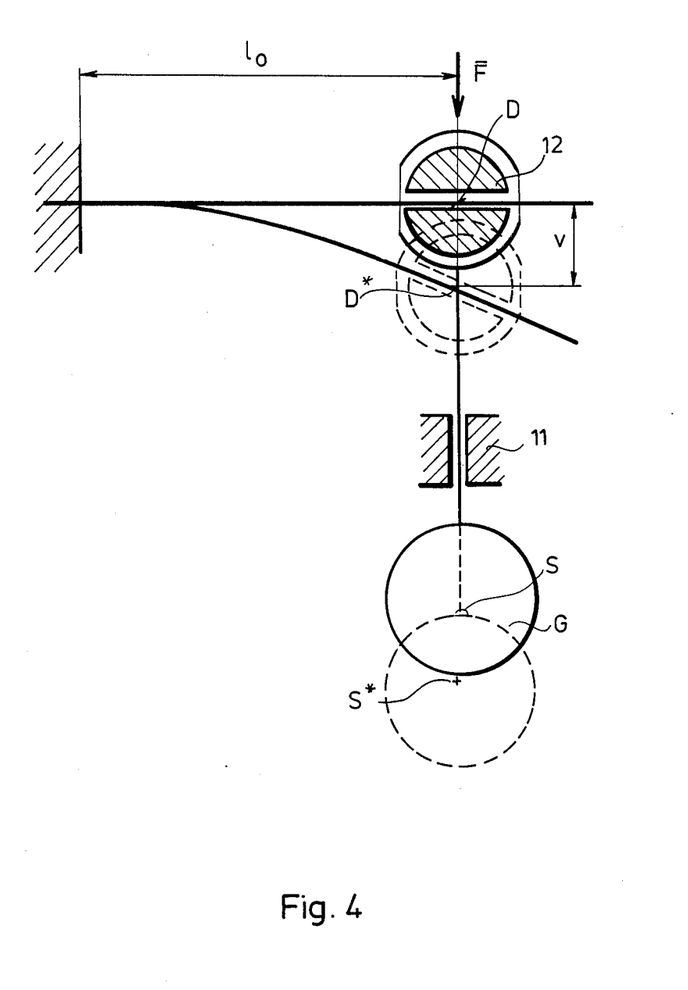
FIG. 4: Diagram showing the kinematic operation of an alternative measuring converter.

Generally the force F produces its effect on the measuring element in the point of application D (FIGS. 3, 4). The measuring element and the force can be arranged in a co-ordinate system (x, y, z). Geometry of the measuring element, direction of the influence line, magnitude of the point of application and force F determine the stress of the measuring element. This stress is composed of the elementary stresses depending on the geometrical dimensions, such as pressure, tension, shearing, bending, torsion. These stresses bring about a vectorial stress field $\bar{p}$ (v) in the measuring element, through which the flux of force is closed with the reaction force R (several reaction forces) in the clamping (clampings), or support (supports).

Figures 1, 2:
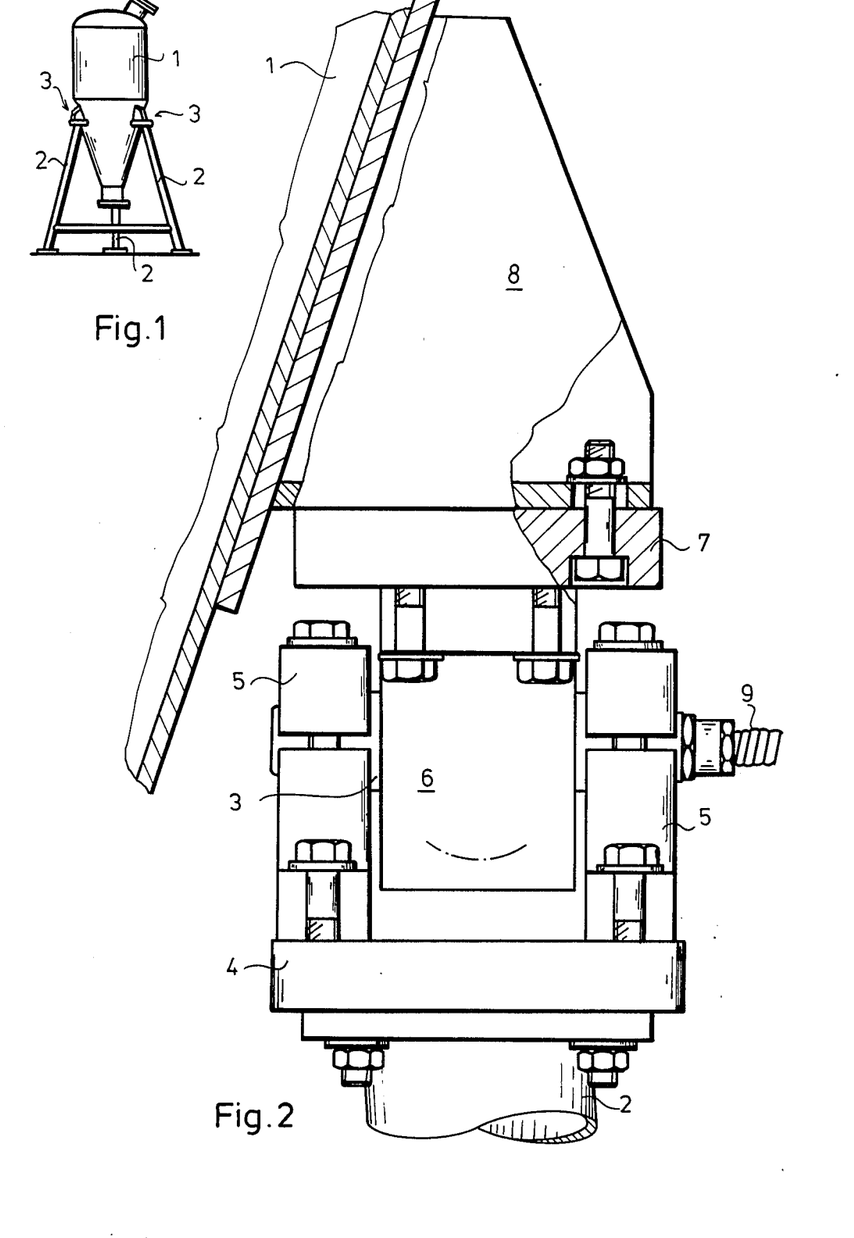
FIG. 1: Illustrates the use of the measuring converter according to the invention in case of supporting a tank.
FIG. 2: Diagram showing the installation of a measuring converter.

Use of a pin-type measuring sensor, given by way of example, is shown in FIG. 1. The tank 1 is fixed to the base on legs 2. The measuring sensors 3 are arranged between tank 1 and legs 2. The measuring sensors 3 are arranged in such clamping devices which ensure the solid connection with both the tank 1 and legs 2.

The clamping device is shown in FIG. 2. A base plate 4 is fixed to the legs 2 with releasable fastening in case of the presented solution. Blocks 5 are screwed to the base plate 4, into which the measuring sensor 3 is clamped. Thus a rigid connection exists between the measuring sensor 3 and base plate 4, the measuring sensor 3 functions as a holder clamped on both ends. The intermedate mounting base 6 is fitted to the middle part, rigidly connected with the upper supporting plate 7. The supporting plate 7 ensures the connection to the console 8 fixed to the tank 1. The measuring sensor 3 is connected with the measuring unit by cable 9.

Under load both the tank 1 and legs 2 suffer deformation. Deformation of the measuring sensors 3 is additional to the deformations. These are interacting through the rigid connection.

Regarding the theoretically possible deformation of the measuring sensors, the following are obtained with the clamped holders:

The spatial arrangement and relative position of the force to be measured and the reaction force in relation to the measuring element make an infinite number of the measuring converters realizable with any geometrical shape of the measuring element.

This deformation appears as relative elongation (or shortening) and/or as relative angular displacement through the modulus of elasticity and modulus of torsional shear characteristic to the material of the measuring element and to the stress field developed between these forces in the measuring element. Similarly some kind of deformation occurs under the influence of stress in all structural elements connected with the measuring sensors 3. These deformations ultimately give a resultant observable in displacement and turn components.

A direction or axis can always be set out in the measuring element, e.g. the neutral axis of bending, or the axis of torsion. With similar view, a centerline in the plane fixed by the influence lines of the mentioned forces and the direction of which is ordered to the selected direction of the given co-ordinate system and also be set out on the measuring converter.

This influence line is the main direction. In the course of using the measuring converter, it is necessary to ensure the invariability of the mutual position of the influence line of the force to be measured and the measuring direction. Consequently the correct measurement necessitates such construction of the measuring converters which is capable to ensure this requirement. Each measuring converter is capable to fulfil this condition only approximately, since the displacement or inclination and the turn are always present.

The foregoing can be easily visualized in case of the holder shown in FIG. 3. The force $\bar{F}$ to be measured is perpendicular to the neutral thread, and its influence line can be moved parallel to itself in case of mass G suspended on the holder. Force $\bar{F}$ is determined by mass G and gravitational acceleration $\bar{g}$ acting on it. Mass G is fixed in the point of suspension D of the holder in such a way that the straight line determined by the centre of gravity S of mass G and by the point of suspension D of the holder always coincides with the direction of gravitational acceleration, i.e. with the direction of influence line of force $\bar{F}$. Length of the bending arm of the holder is $l_o$ in unloaded condition. In loaded condition the bending value of the holder is v, but the length $l_o$ does not vary. However the distance of the point of suspension D from the point of clamping varies, i.e. it will be shorter: $l_x$.

The original linear characteristic curve changes to non-linear as a result of the shortening, and the extent of variation exceeds the permissible margin of error.

The shortening is to be eliminated by maintaining the suspension. This can be solved with ball jointed, double linked mechanism (see FIG. 4.). The ball joint ensures the turning, thus the straight line DS will always be parallel with the gravitational acceleration (or with other designated direction). The link mechanism 10 ensures the constancy of distance $l_o$, and link mechanism 11 ensures the displacement corresponding to the shortening given by the inclination.

Figure 5:
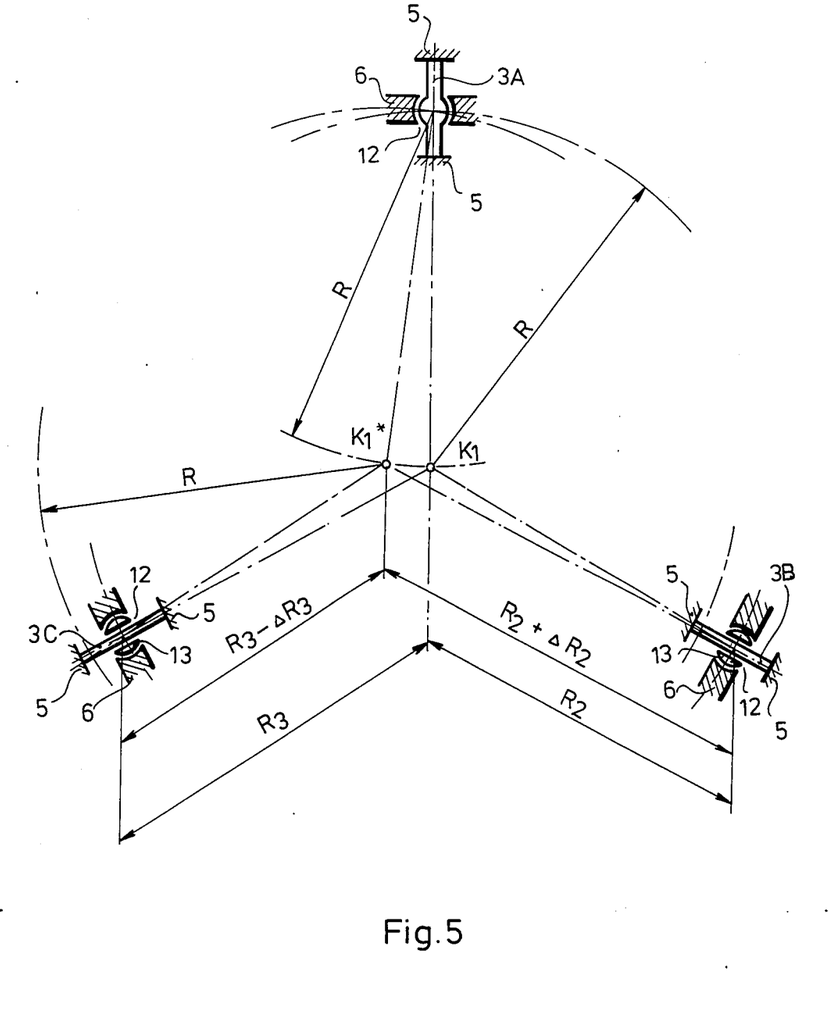
FIG. 5: Diagram showing the formation and arrangement of measuring converters used in the example shown in FIG. 1.

The above principles are applied in the given example also. Tank 1 is supported by measuring sensors 3A, 3B and 3C as shown in FIG. 2. FIG. 5 shows the kinematic diagram of the built-in measuring sensors 3A, 3B and 3C. The shaft-ends of measuring sensors 3A, 3B, 3C are clamped in blocks 5 arranged on legs 2 of tank 1. Spherical nests 12 are formed in holder 6 arranged on the upper supporting plate 7 fixed to tank 1 and the identically shaped spherical surfaces formed on the jacket of measuring sensors 3A, 3B and 3C are fitting into these spherical nests 12.

The spherical surface is directly formed on measuring sensor 3A, thus it is capable only for spatial turning in the spherical nest 12. Inserts 13 with spherical surface are pulled onto the jacket of measuring sensors 3B, 3C and accordingly in addition to the spatial turning, axial displacement is also possible in the points of support.

In assembled condition the measuring sensors 3A, 3B and 3C are arranged along a circle of radius R, and their longitudinal centerlines intersect each other in point $K_1$.

Under the influence of load and temperature the supporting structure (legs 2) and the tank carrying the material to be measured suffer different deformations, since none of them can be made to be absolutely rigid. This diversity brings about additional forces apart from the load force acting on the measuring sensors, which have to be eliminated for the correct operation.

Since tank 1 at the measuring sensor 3A can not move in radial direction, thus it can turn only along a circle of radius R from the centre of the spherical jacket of measuring sensor 3A. Owing to the formation of measuring sensors 3B and 3C allowing radial displacement as well, as a result of the different deformations, the centre $K_1$ of tank 1 will be at a distance of $R_2+\Delta R_2$ and $R_3-\Delta R_3$ along the arc of radius R from its original position in relation to measuring sensors 3B and 3C. Naturally the arrangement of measuring sensors 3A, 3B and 3C remains invariable in relation to the tank.

After all, the center of measuring sensor 3A is the stationary point in the spatial position of the tank, and tank 1 moves around this point in relation to legs 2, while deformation of measuring sensors 3A, 3B and 3C is brought about by the load force only.

Figure 6:
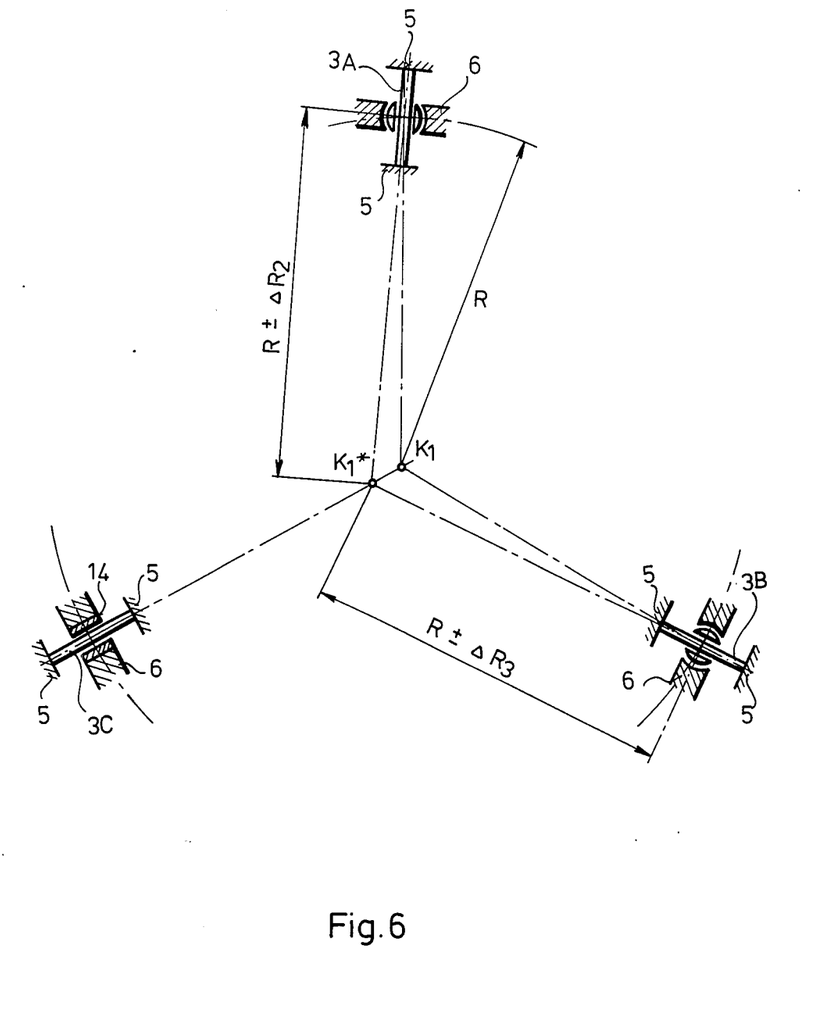
FIG. 6: Diagram showing another system of the measuring converters.

FIG. 6 shows such arrangement, where the tank is to be kept on the legs in a fixed direction. This is ensured by the slidable bedding of the measuring sensor 3C in bushing 14. Bushing 14 is embedded in holder 6 similarly to insert 13, suitably through the intermediation of an elastic layer.

The measuring sensors 3A and 3B are identical with measuring sensor 3B shown in FIG. 5.

Since at measuring sensor 3C only axial displacement can occur, the deformation variation caused by the load and temperature is compensated with the turn and axial displacement of measuring sensors 3A and 3B as well as with the axial displacement of measuring sensor 3C, and thereby only the force arising from the load is transferred to the measuring sensors 3A, 3B and 3C. This way the possibility of the development of all additional forces are eliminated.

In the examples the longitudinal center line of the measuring sensors intersect each other in one point, i.e. they are in "star" arrangement. However the measuring sensors may be arranged in such a way also, that the centerlines of each pair intersect each other. In this case the correct operation of the measuring sensors can be ensured by clamping outside the points of intersection.

Figure 7:
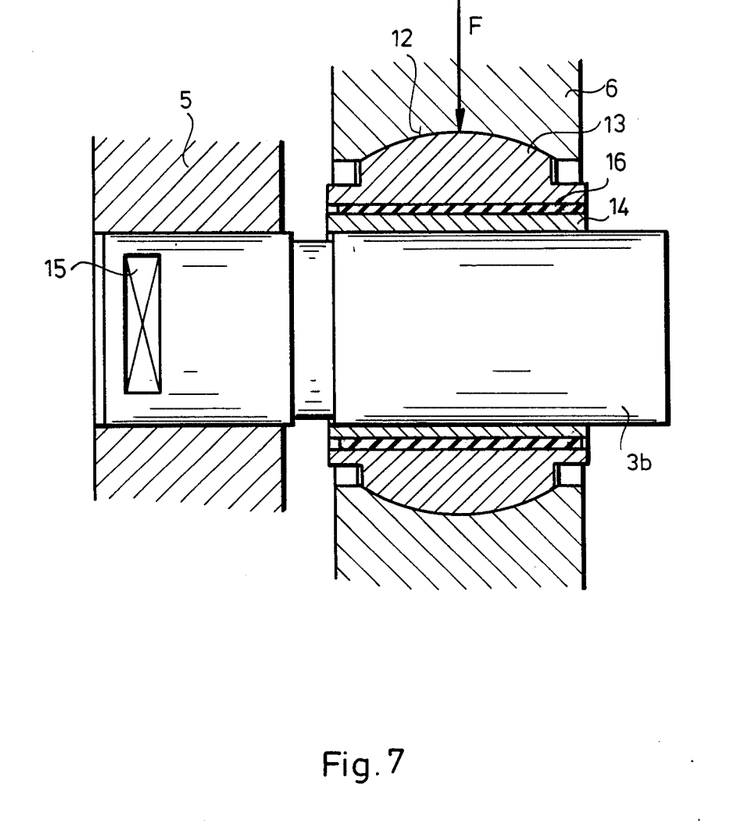
FIG. 7: Sectional view of the built-in measuring sensor according to the invention.

Some embodiments of the measuring sensors shown in the kinematic diagram are presented in the following:

FIG. 7 illustrates a measuring sensor in built-in position, which corresponds to the one shown in FIG. 6. This type of building-in allows axial displacement and spatial turning. The measuring converter 3B is clamped into block 5 of the fixed apparatus. The measuring converter 3B is clamped in the desired position with the aid of locating surfaces 15.

Measuring converter 3B is formed as cylindrical pin, and bushing 14 is arranged on the portion of converter 3B extending from block 5. Insert 13 having spherical surface is arranged on bushing 14 over the elastic layer 16. This insert 13 embeds the holder 6 of the structure exposed to the load force.

Under the influence of load force $\overline{F}$ the measuring converter 3B suffers deformation, since however the bushing 14 is capable to move parallel with the centerline of measuring converter 3B, while the holder 6 is capable of turning on the spherical surface of insert 13 in optional direction, thus the influence line of the load force $\overline{F}$ remains invariable. In addition, the elastic layer 16 ensures the absorption of the different dynamic vibrations.

The fittings suitably selected in the construction in order to avoid trouble in the conversion of force to electric signal caused by the forces of friction arising on the jacket of the measuring converter 3B and on the jacket of insert 13, or to compensate the effects of such forces mechanically and/or electrically.

Figure 8:
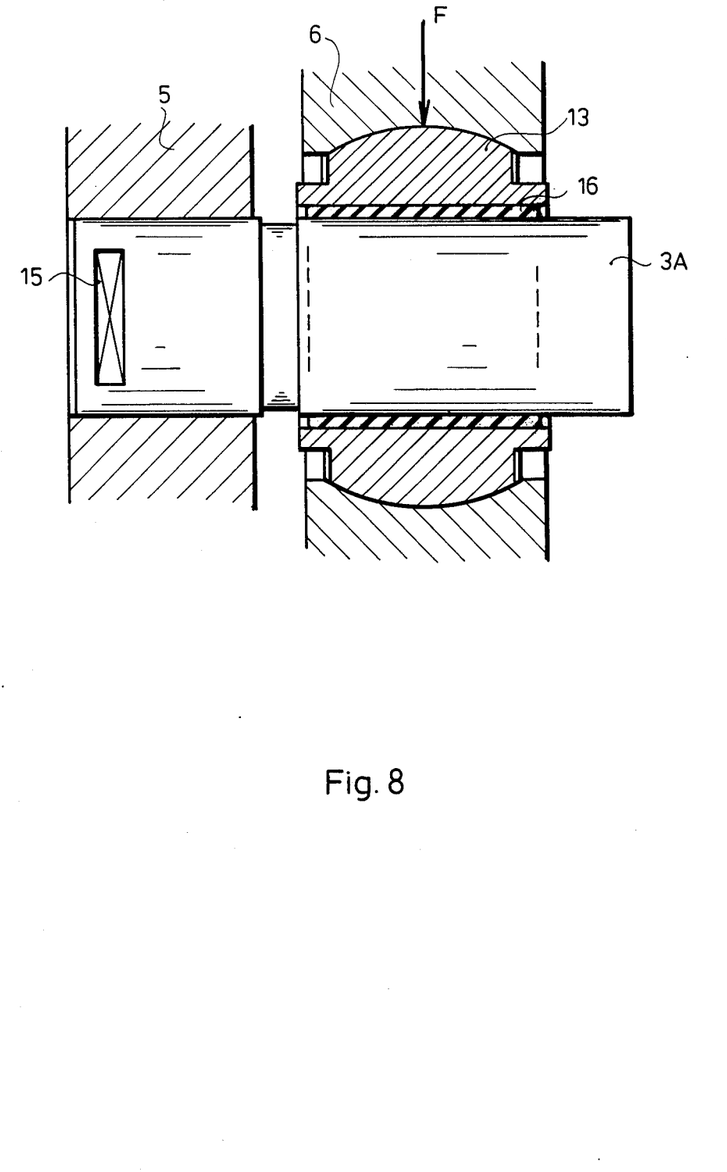
FIG. 8: Sectional view of an alternative measuring sensor according to the invention.

If the unit on which the load force $\overline{F}$ acts has to be kept in oriented position and displacement is possible only along the influence line, while the measuring converter may turn (measuring converter 3B, FIG. 5), the construction shown in FIG. 8 is applicable. In this diagram the measuring converter 3A is clamped into block 5, similarly, in an oriented position. The elastic layer 16 is arranged on the jacket surface directly without an intermediate bushing while the insert 13 seating the spherical jacket is arranged on the elastic layer. Accordingly the holder 6 is capable of turning only on the spherical jacket of insert 13 without displacement in the axial direction.

Figure 9:
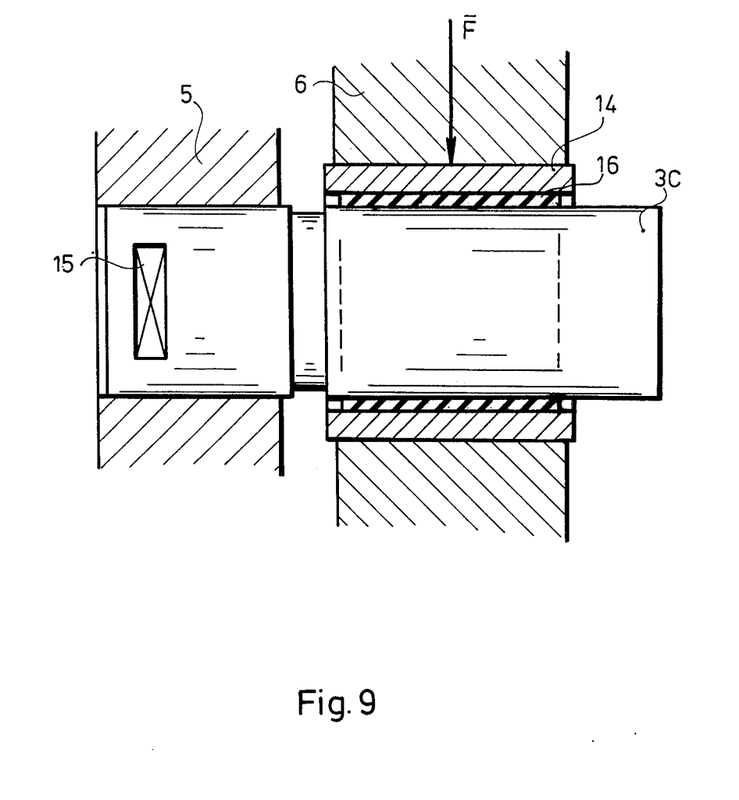
FIG. 9: Sectional view of a further alternative measuring sensor according to the invention.

FIG. 9 shows the construction corresponding to the measuring converter 3C shown in FIG. 6. The measuring converter 3C is oriented also in this case on the locating surface 15 in block 5. The elastic layer 16 is fitting directly onto the jacket of measuring converter 3C, while bushing 14 is arranged thereon. During deformation occurring under the influence of external force $\overline{F}$, the holder 6 is capable of moving only in the axial direction in relation to the measuring converter 3C, i.e. it retains its oriented position.

Naturally the constructions shown in FIGS. 7-9 are only examples for embodiments of the measuring sensors according to the invention. A number of other constructions can be realized, however in the practice. For instance, the sperical surface may be formed directly on the measuring converter (measuring converter 3A, FIG. 5), in this case however it is advisable to arrange the elastic layer in the holder. Such built-in construction may also be produced, where the measuring converter is formed as a holder clamped on both sides, i.e. as a multi-support holder (FIG. 5: measuring converters 3B, 3C; FIG. 6: measuring converters 3A, 3B).

Common advantage of all constructions is that as a result of the formation according to the invention, the measuring sensors are loaded only by the force to be measured, the development of other force effects arising from the different deformations of the structure and measuring sensors are avoidable.

What I claim is:

1. Electromechanical apparatus for the conversion of a force to an electric signal comprising a member for receiving a force (F) to be measured, measuring sensors (3A, 3B, 3C) each having a member for transferring a reaction force, fitting surfaces formed between the member for receiving the force (F) to be measured and the measuring sensors (3A, 3B, 3C) for allowing multi-directional displacement, said member for transferring the reaction force is rigidly clamped, characterized in that said multi-directional displacement includes axial displacement and the fitting surfaces allowing axial displacement are formed as the outer surfaces of a shaft and inner surfaces of a bushing (14) and an insert (13) in each of the measuring sensors (3A, 3B, 3C).

2. The apparatus claimed in claim 1, characterized in that an elastic layer (16) for absorbing the kinetic energy is arranged between the measuring sensors (3A, 3B, 3C) and the member receiving the force (F) to be measured.

3. The apparatus claimed in claim 2, characterized in that the elastic layer (16) for absorbing the kinetic energy is an elastic material.

4. Electromechanical apparatus for the conversion of a force to the electric signal comprising a member for receiving a force (F) to be measured, measuring sensors (3A, 3B, 3C) each having a member for transferring a reaction force, fitting surfaces formed between the member for receiving the force (F) to be measured and the measuring sensors (3A, 3B, 3C) for allowing multi-directional displacement, said member for transferring the reaction force is rigidly clamped, characterized in that said multi-directional displacement includes spatial turn-around-a-point displacement and the fitting surfaces allowing spatial turn-around-a-point displacement are spherical surfaces formed on the jacket of a shaft in each of the measuring sensors (3A, 3B, 3C).

5. The apparatus as claimed in claim 4, characterized in that an elastic layer (16) for absorbing the kinetic energy is arranged between the measuring sensors (3A, 3B, 3C) and the member receiving the force (F) to be measured.

6. The apparatus as claimed in claim 5, characterized in that the elastic layer (16) for absorbing the kinetic energy is an elastic material.

* * * * *